United States Patent Office 2,782,094

Patented Feb. 19, 1957

2,782,094

POTASSIUM NITRATE OF REDUCED TENDENCY TO CAKING AND SETTING

Jack Ames, Ardrossan, Scotland, assignor to Imperial Chemical Industries Limited, a corporation of Great Britain No Drawing. Application May 6, 1954, Serial No. 428,101

Claims priority, application Great Britain June 12, 1953

10 Claims. (Cl. 23—102)

The present invention is concerned with a method of lowering the tendency towards caking and setting of potassium nitrate and with providing potassium nitrate having a greatly reduced tendency towards caking and setting to a hard mass on storage. The invention is also concerned with potassium nitrate products in multi-particulate solid form which include said potassium nitrate having a greatly reduced tendency towards caking and setting.

Potassium nitrate is a salt having a relatively high temperature co-efficient of solibility in water, and, although not inordinately hygroscopic, particles of solid potassium nitrate have an objectionable tendency to cake and set into lumps or into a continuous mass on storage. This is believed to be due to the formation of crystalline bridges from a saturated solution which is formed between adjacent particles of potassium nitrate either due to incomplete drying or absorption of moisture from the atmosphere and which crystallises when changes occur in atmospheric conditions. This tendency of potassium nitrate to cake or set is not only an extreme inconvenience in the handling of the salt in bulk or in bags, but may also interfere with some of its applications.

In British Patent No. 656,048 there is described and claimed inter alia a method of treating potassium nitrate crystals so as to lower their tendency towards setting which comprises depositing on the surfaces of said crystals by evaporation from aqueous solution a dyestuff of sulphonated aromatic character such that when said dyestuff is dissolved in a hot saturated aqueous solution of potassium nitrate and the resulting solution is cooled to incipient crystallisation the potassium nitrate crystals that begin to appear are in the form of thin fragile plate-like friable crystals. In said British patent there is also described and claimed inter alia potassium nitrate in non-adhering free-flowing form consisting of potassium nitrate crystals bearing on their surfaces a deposit of a dyestuff of sulphonated aromatic character such that when said dyestuff is dissolved in a hot saturated aqueous solution of potassium nitrate and the resulting solution is cooled to incipient crystallisation the potassium nitrate crystals that begin to appear are in the form of thin fragile plate-like friable crystals. The preferred dyestuffs of the aforesaid character are 1:4-diamino-anthraquinone 2-sodium sulphonate and a sodium salt of 1:4:5:8-tetramino-anthraquinone disulphonic acid, and the preferred amounts of the dyestuff range from 0.01 to 0.10 part per 100 parts potassium nitrate. Naturally all dyestuffs of sulphonated aromatic character when deposited on the crystal surfaces of the potassium nitrate strongly colour the crystals; e. g. the aforesaid preferred dyestuffs colour the potassium nitrate an intense blue violet or a deep blue.

For certain purposes the presence of said colour is undesirable, and it is an object of the invention to provide potassium nitrate of reduced caking and setting properties having a normal white appearance.

Among the dyestuffs aforementioned it was noted that a large number of sulphonated mono-azo-naphthalene dyestuffs were effective as crystal habit modifiers and it was thus considered that a colourless compound definable as a condensation product of 1 mol. of formaldehyde and 2 mols. of a naphthalene monosulphonic acid wherein the methylene group replaces the chromophoric azo group might have comparable crystal habit modifying properties for potassium nitrate without the accompanying disadvantages of colour.

Potassium nitrate of reduced tendency towards caking and setting on storage according to the invention consists of potassium nitrate crystals bearing on their surfaces a deposit comprising a salt soluble in a saturated aqueous potassium nitrate solution at 20° C. of at least one compound definable as a condensation product of 1 mol. of formaldehyde and 2 mols of a naphthalene monosulphonic acid.

According to the present invention the method for the production of potassium nitrate of reduced tendency to caking and setting on storage comprises effecting crystallisation of an aqueous solution of potassium nitrate containing a salt soluble in a saturated aqueous potassium nitrate solution at 20° C. of at least one compound definable as a condensation product of 1 mol. of formaldehyde and 2 mols. of a naphthalene monosulphonic acid.

Alternatively, according to the invention the method of treating potassium nitrate crystals so as to lower their tendency towards caking and setting on storage comprises depositing on the surfaces of said crystals by evaporation from aqueous solution a deposit comprising a salt soluble in a saturated aqueous potassium nitrate solution at 20° C. of at least one compound definable as a condensation product of 1 mol. of formaldehyde and 2 mols. of a naphthalene monosulphonic acid.

It is assumed that in said compound which is a disulphonic acid of a dinaphthylmethane the sulphonic acid groups are in the rings to which the methylene group is not attached and are in one of the α positions in one naphthyl group and in one of the α positions in the other naphthyl group or in one of the β positions in one naphthyl group and in one of the β positions in the other naphthyl group or in one of the α positions in one naphthyl group and in one of the β positions in the other naphthyl group depending upon whether naphthalene-α-sulphonic acid, naphthalene-β-sulphonic acid, or an equimolecular mixture of these is reacted with formaldehyde or its equivalent, preferably in the presence of sulphuric acid or hydrochloric acid, as for example in accordance with the method described in Canadian specification No. 347,865 or U. S. specification No. 2,046,757.

Since as indicated in said Canadian and U. S. specifications the precise position of the methylene group in the resulting disulphonic acids has not yet been ascertained with certainty it is not strictly correct to define a disulphonic acid of a dinaphthylmethane used in the form of a soluble salt to carry out the invention by referring to the α:α′, β:β′ or α:β′ positions for the purpose of locating the sulphonic acid groups in the two naphthyl groups. Nevertheless, for convenience hereinafter the disulphonic acids of dinaphthylmethane will be referred to as α:α′, β:β′, or α:β′-disulphonic acids of dinaphthylmethane according to whether the compound is derived respectively by reacting with formaldehyde or its equivalent naphthalene-α-sulphonic acid, naphthalene-β-sulphonic acid, or an equimolecular mixture of these two naphthalenesulphonic acids.

Potassium nitrate belongs to the ortho-rhombic crystal system and is normally obtained on crystallisation from water in the form of pseudo-hexagonal prisms (sometimes pyramidally capped) resulting from twinning of the ortho-rhombic crystals on {110} faces, the predominant faces in the resulting forms being {010} and {110} faces.

When crystallised from a solution of a soluble salt of any of the aforesaid disulphonic acids of a dinaphthylmethane, however, crystal growth on the {001} faces is retarded relative to crystal growth on the other faces, and the crystals obtained are flat plates in which the {001} faces predominate. These plates have cleavage planes at angles to the {001} faces, namely a perfect cleavage in a {011} plane and imperfect cleavage on {010} and {110} planes. These modified crystals are of reduced mechanical strength because of the angular disposition of these cleavage planes, and thus it is assumed that the strength of the bridges of recrystallised material which form between adjacent particles of potassium nitrate in the presence of said salts is reduced. Even if already existing crystals of normal habit are surface treated with the aforesaid soluble salts, however, any crystal bridges formed by recrystallisation between adjacent particles of the so-treated potassium nitrate as a result of atmospheric variations will be of correspondingly reduced strength as compared with those formed in the case of untreated potassium nitrate. Quantities of the aforesaid salts of dinaphthylmethane disulphonic acids from at least approximately 0.025% reckoned on the weight of the dry potassium nitrate particles are effective in varying degree, and it is preferred to employ quantities from 0.05 to 0.1% by weight.

The invention may be put into effect by dissolving a soluble salt of the aforesaid dinaphthylmethane disulphonic acid in the aqueous solution from which the potassium nitrate is obtained in solid form, for example by graining or direct crystallisation of the potassium nitrate. When the potassium nitrate crystallises out the interior of the solid crystal particles is substantially free from the soluble salt of the dinaphthylmethane disulphonic acid and it is evaporation of the adhering mother liquor which deposits the thin coating on the crystals. Another and preferred method of applying the aforesaid salt of the dinaphthylmethane disulphonic acid is to dissolve the latter in water and spray or otherwise distribute the resulting solution over the surfaces of previously formed potassium nitrate crystals, and bring about evaporation of the water while keeping the particles in motion.

The invention is illustrated in the following examples, in which the percentages are percentages by weight.

*Example 1*

The sodium salt of $\beta$:$\beta'$-disulphonic acid of dinaphthylmethane is prepared by heating under gentle reflux for 24 hours a mixture of 8.3 parts by weight of $\beta$-naphthalenesulphonic acid, 1.9 parts by weight of an aqueous solution of formaldehyde (37% w./v.) and 1.9 parts by weight of sulphuric acid (S. G. 1.84) in 10 parts by weight of water and neutralising the resulting liquor with a sodium hydroxide solution.

Pulverised potassium nitrate of particle size passing a 170 British Standard Specification mesh screen is treated with 0.05% of the sodium salt of $\beta$:$\beta'$-disulphodinaphthylmethane sprayed on as a 10% aqueous solution. The product is mixed in an incorporator and the excess water driven off, so that the potassium nitrate acquires a surface coating of the said sodium salt. The dry product preserves the original prismatic form and white colour of the granules, and is markedly resistant to setting even after storage in unsealed cardboard containers for several months.

*Example 2*

Potassium nitrate is crystallised from aqueous solution with vigrous stirring in the presence of 0.1% of the sodium salt of $\beta$:$\beta'$-disulphodinaphthylmethane. The resulting potassium nitrate is in small crystals. These crystals are separated from their mother liquor and dried. They are free running and markedly resistant to setting and perfectly white.

*Example 3*

The sodium salt of $\alpha$:$\alpha'$-disulphonic acid of dinaphthylmethane is prepared by heating under gentle reflux for 24 hours a mixture of 8.5 parts by weight of $\alpha$-naphthalenesulphonic acid, 2.0 parts by weight of an aqueous solution of formaldehyde (37% w./v.) and 2.7 parts by weight of sulphuric acid (S. G. 1.84) in 10 parts by weight of water and neutralising the resulting liquor with a sodium hydroxide solution.

The procedure is the same as for Example 1 except that the sodium salt of $\alpha$:$\alpha'$-disulphodinaphthylmethane is used instead of the $\beta$:$\beta'$ isomer. The resultant product preserves its white colour and is free running and strongly resistant to setting, though the effect is not so marked as in Example 1. These characteristics remain after several months storage in loosely-stoppered bottles.

*Example 4*

The sodium salt of $\alpha$:$\beta'$-disulphonic acid of dinaphthylmethane is prepared by heating under gentle reflux for 24 hours a mixture of 20.8 parts by weight of $\alpha$-naphthalenesulphonic acid, 20.8 parts by weight of $\beta$-naphthalenesulphonic acid, 11.0 parts by weight of aqueous formaldehyde solution (37% w./v.) and 12.5 parts by weight of sulphuric acid (S. G. 1.84), in 44 parts by weight of water and neutralising the resulting liquor with a sodium hydroxide solution.

The procedure is the same as for Example 2, except that the sodium salt of $\alpha$:$\beta'$-disulphodinaphthylmethane is used instead of the $\beta$:$\beta'$ isomer. The resulting small crystals are white in colour, free running and strongly resistant to setting.

What I claim is:

1. Potassium nitrate of reduced tendency to caking and setting on storage comprising discrete potassium nitrate particles carrying on their surfaces a deposit of at least one salt of an acid selected from the group consisting of the a:a', b:b' and a:b' disulphonic acids of dinaphthylmethanes, said salt being soluble in a saturated aqueous potassium nitrate solution at 20° C.

2. Potassium nitrate as claimed in claim 1 wherein the quantity of the soluble salt of the aforesaid disulphonic acids of dinaphthyl methane is at least approximately 0.025% reckoned on the weight of the dry potassium nitrate particles.

3. Potassium nitrate as claimed in claim 2 wherein the quantity of said soluble salt is from 0.05 to 0.1%.

4. Potassium nitrate according to claim 1 wherein the a:a'-disulphonic acid is the condensation product of formaldehyde and naphthalene-a-sulphonic acid.

5. Potassium nitrate according to claim 1 wherein the b:b' disulphonic acid is the condensation product of formaldehyde and naphthalene-b-sulphonic acid.

6. Potassium nitrate according to claim 1 wherein the a:b-disulphonic acid is the condensation product of formaldehyde and an equimolecular mixture of naphthalene-a-sulphonic acid and naphthalene-b-sulphonic acid.

7. A method for the production of potassium nitrate of reduced tendency to caking and setting on storage which comprises effecting crystallization of an aqueous solution of potassium nitrate containing at least one salt of an acid selected from the group consisting of the a:a', b:b' and a:b' disulphonic acids of dinaphthylmethanes, said salt being soluble in a saturated aqueous potassium nitrate solution at 20° C.

8. A method as claimed in claim 7 which comprises effecting the direct crystallisation of the aqueous solution of potassium nitrate containing the said salt.

9. A method as claimed in claim 7 which comprises effecting the granulation of an aqueous solution of potassium nitrate containing the said salt.

10. A method for the production of potassium nitrate of reduced tendency to caking and setting on storage which comprises depositing on the surfaces of crystals of already formed potassium nitrate by evaporation from aqueous solution a deposit comprising at least one salt of an acid selected from the group consisting of the a:a′, b:b′ and a:b′ disulphonic acids of dinaphthylmethanes, said salt being soluble in a saturated aqueous potassium nitrate solution at 20° C.

References Cited in the file of this patent

UNITED STATES PATENTS 2,616,785 Butchart ---------------- Nov. 4, 1952

FOREIGN PATENTS 656,048 Great Britain ------------ Dec. 29, 1948